United States Patent [19]
Williams

[11] Patent Number: 5,548,189
[45] Date of Patent: Aug. 20, 1996

[54] FLUORESCENT-LAMP EXCITATION CIRCUIT USING A PIEZOELECTRIC ACOUSTIC TRANSFORMER AND METHODS FOR USING SAME

[75] Inventor: James M. Williams, Palo Alto, Calif.

[73] Assignee: Linear Technology Corp., Milpitas, Calif.

[21] Appl. No.: 483,374

[22] Filed: Jun. 7, 1995

Related U.S. Application Data

[63] Continuation-in-part of Ser. No. 339,347, Nov. 14, 1994, which is a continuation of Ser. No. 43,152, Mar. 31, 1993, Pat. No. 5,408,162, which is a continuation of Ser. No. 857,734, Mar. 26, 1992, abandoned.

[51] Int. Cl.$^6$ .................................................. H05B 37/02
[52] U.S. Cl. .................... 315/224; 315/307; 315/DIG. 5; 315/DIG. 7; 363/133
[58] Field of Search ............................ 315/224, 219, 315/242, 243, 307, 310, 306, 291, DIG. 5, DIG. 7; 363/97, 133

[56] References Cited

U.S. PATENT DOCUMENTS

| | | | |
|---|---|---|---|
| 3,790,826 | 2/1974 | Kawada | 310/8.1 |
| 4,277,728 | 7/1981 | Stevens | 315/307 |
| 4,723,098 | 2/1988 | Grubbs | 315/306 |
| 4,952,849 | 8/1990 | Fellows et al. | 315/307 |
| 5,068,576 | 11/1991 | Hu et al. | 315/291 |
| 5,111,118 | 5/1992 | Fellows et al. | 315/307 |
| 5,424,935 | 6/1995 | Wu | 363/97 |

OTHER PUBLICATIONS

Williams, J. *"Techniques for 92% Efficient LCD Illumination,"* Linear Technology Application Note 55, pp. AN55-1-44, published by Linear technology Corporation, Milpitas, California in Aug. 1993.

*"RCA Designer's Handbook: Solid-State Power Circuits"* Technical Series SP-52, pp. 300-338 and 409-429, published by RCA Corporation, Somerville, New Jersey in 1971.

*"1992 Catalog of Sumida Electric Co., Ltd.,"* pp. 1-5 and 25, published by Sumida Electric Co., Ltd., Japan in 1991.

*Primary Examiner*—Robert Pascal
*Assistant Examiner*—Haissa Philogene
*Attorney, Agent, or Firm*—Fish & Neave; Leo L. Lam; Robert W. Morris

[57] ABSTRACT

A power-supply and control circuit is provided for driving a fluorescent lamp from a low-voltage DC power source such as a battery. In typical lamp-driving circuits, a step-up transformer is used to apply well known magnetic techniques to achieve the low-to-high voltage conversion required by the lamp. The present invention uses a new approach, applying piezoelectric characteristics of certain ceramic materials to replace the magnetic transformer. Resonant characteristics of such ceramic materials permit them to be self-resonated. A DC-to-AC converter coupled to a switching regulator converts low DC voltage into a higher AC voltage for driving the fluorescent lamp. In one embodiment, the lamp is included in a feedback loop which includes a circuit for producing a feedback signal indicative of the magnitude of current conducted by the lamp. The feedback signal is applied to the switching regulator to produce in the lamp a regulated current and, hence, a regulated lamp intensity. A method for driving a fluorescent lamp from a low-voltage DC power source is also provided.

36 Claims, 10 Drawing Sheets

FLUORESCENT-LAMP EXCITATION CIRCUIT USING A PIEZOELECTRIC ACOUSTIC TRANSFORMER AND METHODS FOR USING SAME

CROSS REFERENCE TO RELATED APPLICATIONS

This application is a continuation-in-part of copending U.S. patent application Ser. No. 08/339,347, filed Nov. 14, 1994, which is a continuation of U.S. patent application Ser. No. 08/043,152, filed Mar. 31, 1993, now U.S. Pat. No. 5,408,162, which is a continuation of U.S. patent application Ser. No. 07/857,734, filed Mar. 26, 1992, now abandoned.

BACKGROUND OF THE INVENTION

This invention relates to drive circuits for fluorescent lamps. More particularly, this invention relates to a fluorescent-lamp power-supply circuit that uses piezoelectric characteristics of certain ceramic materials to produce a high-frequency, high-voltage excitation output to drive the lamp.

Fluorescent lamps are finding increased use in systems requiring an efficient and broad-area source of visible light. For example, portable computers, such as lap-top and notebook computers, use fluorescent lamps to back-light or side-light liquid crystal displays to improve the contrast or brightness of the display. Fluorescent lamps have also been used to illuminate automobile dashboards and are being considered for use with battery-driven, emergency-exit lighting systems in commercial buildings.

Fluorescent lamps find use in these and other low-voltage applications because they are more efficient, and emit light over a broader area, than incandescent lamps. Particularly in applications requiring long battery life, Such as in the case of portable computers, the increased efficiency of fluorescent lamps translates into extended battery life, reduced battery weight, or both.

In low-voltage applications such as those discussed above, a power-supply and control circuit must be used to operate the fluorescent lamp. While power typically is provided by a DC source ranging from 3 to 20 volts, fluorescent lamps generally require AC voltage sources of about 1000 volts RMS to start, and over about 200 volts RMS to maintain illumination efficiently. Excitation frequencies for fluorescent lamps typically range from about 20 kHz to about 100 kHz. Accordingly, a power-supply circuit is needed to convert the available low-voltage DC input into the needed high-frequency, high-voltage AC output.

Previously known fluorescent-lamp power-supply circuits have used various drive circuits that convert the low-voltage DC into high-frequency, low-voltage AC having a waveform that approximates a sine wave. The low-voltage AC was then applied to the primary coil of a magnetic step-up transformer. The secondary coils of the step-up transformer produced the high-frequency, high-voltage AC needed to start and maintain illumination of the fluorescent lamp. The output voltage of the step-up transformer is related to the input voltage by the well known relationship: $N2/N1=V2/V1$, where $N1$ is the number of turns on the primary coil, $N2$ is the number of turns on the secondary coil, $V1$ is the input voltage, and $V2$ is the output voltage. The ratio $N2/N1$ is commonly known as the "turns ratio."

The use of magnetic step-up transformers to supply high voltages to applications described above is widespread and well known. Such transformers employ common magnetic techniques to achieve the low-to-high voltage conversion. However, the use of magnetic step-up transformers in power-supply circuits for computer back-lights creates certain undesirable characteristics.

Some key disadvantages of previously known fluorescent-lamp power-supply and control circuits are related to the inherent geometric limitations posed by using a magnetic step-up transformer on the ability to minimize the size of the power-supply circuits.

For example, a long-standing goal in a typical lap-top computer system has been to maximize display area on the "clam-shell" (or lid which contains the display) of the computer while minimizing exterior dimensions of the computer, and thus the size of the power-supply circuits driving the computer's display. It has long been accepted that the power-supply circuit for the display must reside in the clam-shell itself and not in the base (typically containing, among main circuitry, the hard and floppy drives, the keyboard, the battery, etc.). The reason is that driving the back-light requires a high-frequency, high-voltage AC signal that is subject to loss or noise over any extended line. Driving the display in the clam-shell with a power-supply circuit in the base would result in significant losses and thus would not work adequately.

The geometric nature of magnetic step-up transformers and the sheer number of turns required to obtain desired input/output characteristics for driving a fluorescent back-light display limit the ability to make prior art power-supply circuits smaller. A higher output voltage requires more turns, which in turn increases the size of the magnetic transformer.

Another disadvantage of lamp-driving power-supply circuits using magnetic step-up transformers is that failure of the magnetic transformer can be catastrophic to both itself and surrounding components. Because of the high voltages involved in driving fluorescent lamps and the inability of magnetic transformers to handle high-voltage failure, a short-circuit in the output terminals of a magnetic step-up transformer may result in extreme heat dissipation from the transformer towards surrounding electronics. A short-circuit between two turns in the secondary coil could have the same effect. Thus, a short-circuit may generate heat which could damage or destroy the display in addition to damaging the driving electronics.

Furthermore, short-circuits between two turns in a magnetic transformer can be difficult to prevent. First, a high number of secondary turns is required to produce the desired output voltage. Second, the turns are compressed into the most compact package possible to minimize the exterior dimensions of the magnetic device. Therefore, the insulation between each turn is minimal and subject to deterioration.

Using a magnetic transformer presents yet another disadvantage in the event that the fluorescent lamp breaks. A broken lamp basically results in an open-circuit or infinite resistance output for the power-supply circuit. When the circuit detects such a high load, it attempts to drive the load at an even higher voltage (for example, 2–3 times the normal voltage), leading to potentially dangerous high-voltage conditions. A subsequent short-circuit at the output or between turns in the transformer can cause catastrophic failure not only to the transformer itself, but also to the surrounding circuitry. Such failures can present or induce hazards not limited to the computer if the computer is used in a sensitive environment, such as a lap-top being used on an airplane.

The nature of the magnetic transformer as a broadband device presents yet a further disadvantage for its use in power-supply circuits for driving fluorescent lamps.

Because the fluorescent lamp requires a sinusoidal (AC) input signal, the power-supply circuit must produce a sinusoidal output—if no conversion takes place between the output stage of the power-supply circuit and the input stage of the fluorescent lamp. A magnetic transformer, like other broadband devices, requires a sinusoidal input to produce a sinusoidal output. Thus, the magnetic transformer cannot directly accept a square-wave input. A square-wave signal has to be converted to a sinusoidal signal before being applied to the magnetic transformer in order for the transformer to provide a sinusoidal output. This required conversion process adds complexity to the design of the power-supply circuit.

In view of the foregoing discussion, it would therefore be desirable to provide a power-supply and control circuit for a fluorescent lamp that uses a device with inherent fundamental characteristics that are more conducive to the device being used as a step-up transformer than the characteristics of a conventional magnetic-coil transformer.

It would also be desirable to provide a power-supply and control circuit for a fluorescent lamp using a step-up transformer that can be inherently made smaller in all dimensions than conventional magnetic transformers.

It would further be desirable to provide a power-supply and control circuit for a fluorescent lamp that can be made smaller than conventional circuits using magnetic step-up transformers.

It would additionally be desirable to provide a power-supply and control circuit for a fluorescent lamp having a simpler construction than conventional, magnetic, power-supply circuits.

It would further be desirable to provide a power-supply and control circuit for a fluorescent lamp that allows relatively safer high-voltage failure in the step-up transformer, so as not to dissipate extreme heat or induce failure in the electronics surrounding the transformer.

It would still further be desirable to be able to provide such a fluorescent-lamp power-supply and control circuit that uses a step-up transformer with a relatively high internal resistance and ability to withstand high-voltage operation.

It would still further be desirable to provide a fluorescent-lamp power-supply and control circuit using a transformer that does not require a sinusoidal input in order to generate a high-frequency, high-voltage AC output.

SUMMARY OF THE INVENTION

It is an object of this invention to provide a fluorescent-lamp power-supply and control circuit that uses a device with inherent fundamental characteristics that are more conducive to the device being used as a step-up transformer than the characteristics of a conventional magnetic-coil transformer.

It is also an object of this invention to provide a fluorescent-lamp power-supply and control circuit that uses a step-up transformer that can be inherently made smaller in all dimensions than conventional magnetic transformers.

It is a further object of this invention to provide a fluorescent-lamp power-supply and control circuit that can be made smaller than conventional circuits using magnetic step-up transformers.

It is an additional object of this invention to provide such a fluorescent-lamp power-supply and control circuit having a simpler construction than conventional, magnetic, power-supply circuits.

It is yet an additional object of this invention to provide such a fluorescent-lamp power-supply and control circuit that allows relatively safer high-voltage failure in the step-up transformer, so as not to dissipate extreme heat or induce failure in the electronics surrounding the transformer.

It is still another object of this invention to provide a fluorescent-lamp power-supply and control circuit that uses a step-up transformer with a relatively high internal resistance and ability to withstand high-voltage operation.

It is a further object of this invention to provide a fluorescent-lamp power-supply and control circuit using a transformer that does not require a sinusoidal input in order to generate a high-frequency, high-voltage AC output.

These and other objects of the invention are accomplished in accordance with the principles of the present invention by a power-supply and control circuit and method for driving a fluorescent lamp from a low-voltage DC source using a ceramic step-up transformer. Regulator elements are powered by the DC source and are coupled to DC-to-AC elements, the output of which, in turn, is coupled to a first terminal of the lamp. A step-up circuit converts, under control of the regulator elements, the low-voltage DC supplied by the input DC power source to high-voltage sinusoidal AC sufficient to operate the fluorescent lamp.

In one embodiment of the present invention, a second terminal of the lamp is coupled to a circuit which senses and produces a signal indicative of the magnitude of current conducted by the lamp. This current-sense signal is fed back to the regulator in such manner so as to regulate the current supplied to the lamp by the ceramic transformer. As a result, the current conducted by the lamp—and, hence, the intensity of the light emitted by the lamp—are regulated as a function of the current-feedback signal.

In another embodiment, and in accordance with another aspect of the invention, the terminals of the fluorescent lamp may be coupled across the terminals of the ceramic transformer's AC output such that the lamp fully floats without any direct connection to the driving circuitry. The output of the fluorescent lamp is indirectly regulated by circuitry which monitors the lamp's drive power. As a result, asymmetries in the lamp's drive are reduced to cause a more uniform distribution of energy and light output across the length of the lamp.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Cold-cathode fluorescent lamps (CCFL) often used for back-light illumination, require high-frequency, high-voltage drive. Typically, such lamps require about 1000 volts to start, and 200–500 volts RMS to maintain illumination. Excitation frequencies typically range from 20 to 100 kHz.

The high voltages required for a fluorescent-lamp display are not normally available through the circuitry used in a computer and must be created with some form of voltage converter. Invariably, the high voltage is generated by driving a step-up transformer with some form of low-voltage AC waveform. Known step-up transformers have previously employed well known magnetic techniques to achieve the low-to-high voltage conversion.

The present invention uses the piezoelectric characteristics of certain ceramic materials to replace the magnetic transformer. Resonant characteristics of such ceramic materials permit them to be self-resonated. The use of ceramic materials instead of magnetic materials in the transformer enables the driving circuitry to be simpler and more compact, thus saving space and weight in the display.

Figure 1:
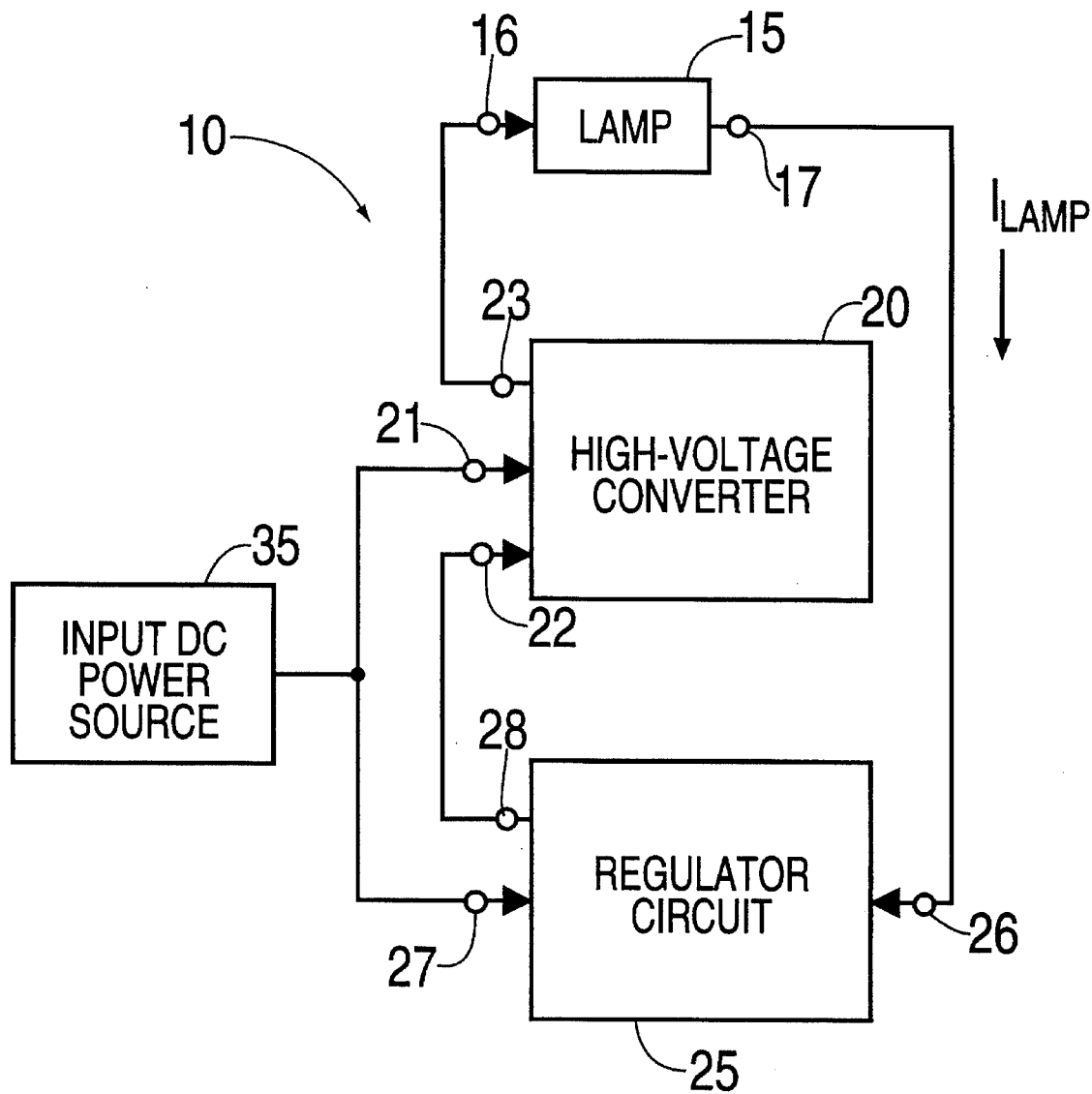
FIG. 1 is a block diagram of a fluorescent-lamp power-supply and control circuit which incorporates principles of the present invention.

FIG. 1 is a block diagram of the fluorescent-lamp power-supply and control circuit 10 incorporating principles of the present invention.

As shown in FIG. 1, input DC power source 35 provides power for the circuit. Power source 35 can be any source of DC power. For example, in the case of a portable computer such as a lap-top or notebook computer, power source 35 can be a nickel-cadmium or nickel-hydride battery providing 3–5 volts. Or, if the circuit of the present invention is used with an automobile dashboard, power source 35 can be a 12–14 volt automobile battery and power supply. Similarly, fluorescent lamp 15 can be any type of fluorescent lamp. For example, in the case of lighting a display in a portable computer, fluorescent lamp 15 can be a cold- or hot-cathode fluorescent lamp.

Input DC power source 35 supplies low-voltage DC to regulator circuit 25 (at terminal 27) and high-voltage converter 20 (at terminal 21). Regulator circuit 25 can be a linear or switching regulator but, for maximum efficiency, a switching regulator is preferred. The output of regulator circuit 25 is taken from terminal 28. Terminal 26 is a feedback terminal adapted to receive a feedback signal by which the output of regulator circuit 25 can be controlled. If regulator circuit 25 is a switching regulator, then feedback terminal 26 causes the duty cycle of the regulator's switching transistor to be controlled to regulate the output.

Regulator circuit 25 may also contain a current feedback element (not shown in FIG. 1) coupled to terminal 17 of lamp 15. The feedback element signals the magnitude of current $I_{LAMP}$ conducted by fluorescent lamp 15. Regulator circuit 25 uses feedback from the lamp 15 to direct the gain in high-voltage converter 20 and thus the intensity in fluorescent lamp 15.

High-voltage converter 20 contains a piezoelectric element (not shown in FIG. 1) such as a ceramic step-up transformer to produce high-voltage AC. High-voltage converter 20 receives a low-voltage DC input at terminal 21 from input DC power source 35, and produces at output terminal 23 high-voltage AC output sufficient in magnitude to drive fluorescent lamp 15. Typically, the AC voltage produced by converter 20 is 100 volts or more. Terminal 22 is a control terminal coupled to receive from terminal 28 of regulator circuit 25 a control signal. The control signal regulates the output of high-voltage converter 20, in a manner as described below. The output of converter 20 is coupled to lamp 15 at the lamp's terminal 16 (typically, through a conventional ballast capacitor not shown). For maximum efficiency of operation, and to minimize the emission of radio frequency interference, converter 20 converts DC power to sinusoidal AC power.

The circuit of FIG. 1 operates as follows. High voltage converter 20, in combination with regulator circuit 25, delivers high voltage AC power to fluorescent lamp 15. The current through fluorescent lamp 15, $I_{LAMP}$, is sensed by a current feedback element in regulator circuit 25. By coupling a feedback loop to a feedback terminal of regulator circuit 25, the output of regulator circuit 25 is modulated as a function of the magnitude of $I_{LAMP}$. The output of regulator circuit 25, in turn, controls and modulates the output of converter 20. As a result, the magnitude of current ($I_{LAMP}$) conducted by fluorescent lamp 15—and, hence, the intensity of light emitted by the lamp—is regulated to a substantially constant value.

By including lamp 15 in a current feedback loop with regulator 25, the lamp's current and light intensity will be regulated and thus will remain substantially constant despite changes in input power, lamp characteristics or environmental factors. Circuit 10 functions to keep the lamp current $I_{LAMP}$ substantially constant, independent of lamp impedance or power-supply voltage. Thus, as a lamp's impedance goes up or down as the lamp itself ages, control circuit 10 adjusts to such change as appropriate so as to maintain a regulated constant current and lamp intensity. Control circuit 10 similarly adjusts as the power-supply voltage fluctuates. These features of the present invention can therefore extend the useful lifetime of a fluorescent lamp in some applications.

It will, of course, be appreciated by those skilled in the art that other circuit techniques and configurations could be used to provide variable control of the lamp current. For example, similar lamp intensity control action could as well be obtained by adding a signal (not shown) at the feedback point (terminal 26 of regulator circuit 25) to adjust loop gain.

Figure 2:
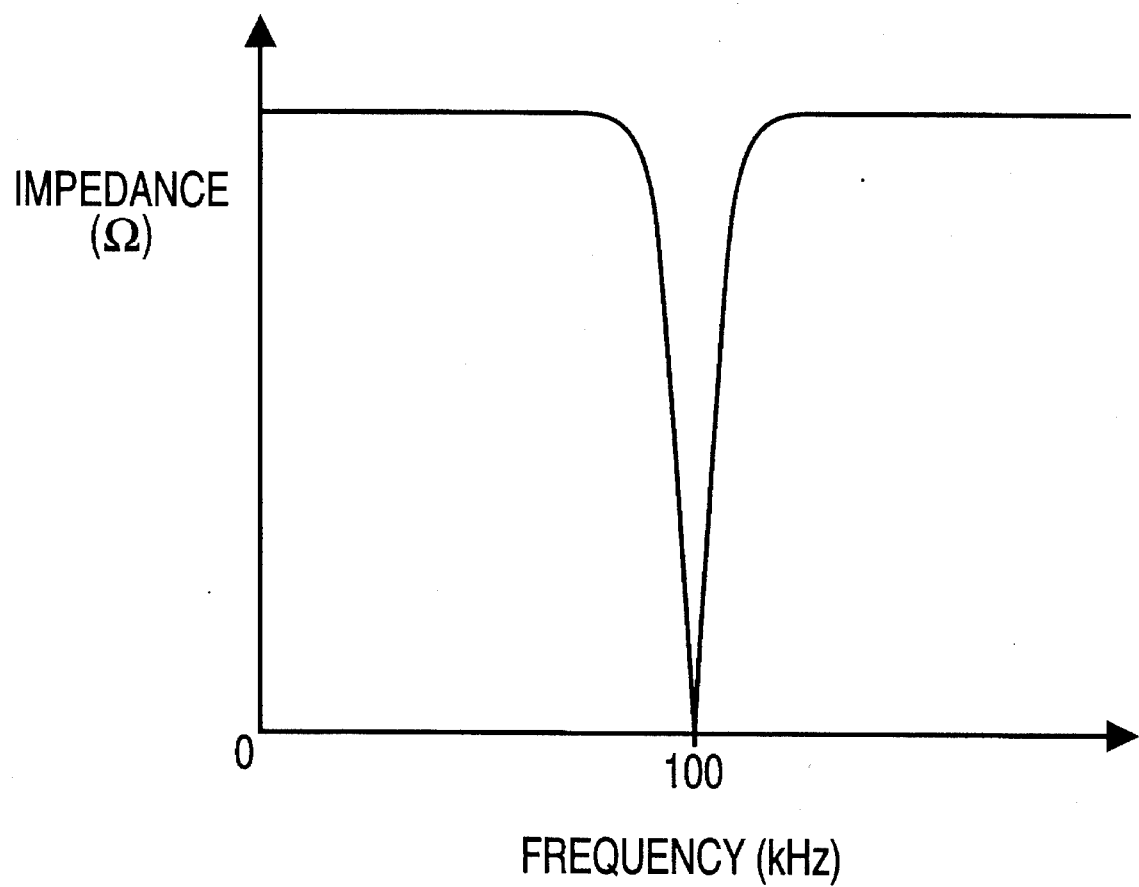
FIG. 2 is a graph plotting frequency against the impedance characteristics of an exemplary ceramic transformer used according to the principles of the present invention.

FIG. 2 provides a graph in which frequency is plotted against impedance for a ceramic transformer with a resonant frequency of 100 kHz. Theoretically the device impedance of the ceramic transformer is zero at resonance and infinite at non-resonant frequencies. As shown in FIG. 2, the impedance of the device is negligible at resonance and steeply ramps up to a high impedance at all other frequencies. Thus, as frequency is tuned towards resonance from either direction, the impedance abruptly spikes down to its lowest value. The steep non-linear ramps forming either side of the impedance spike are sometimes referred to as "skirts."

Figure 3:
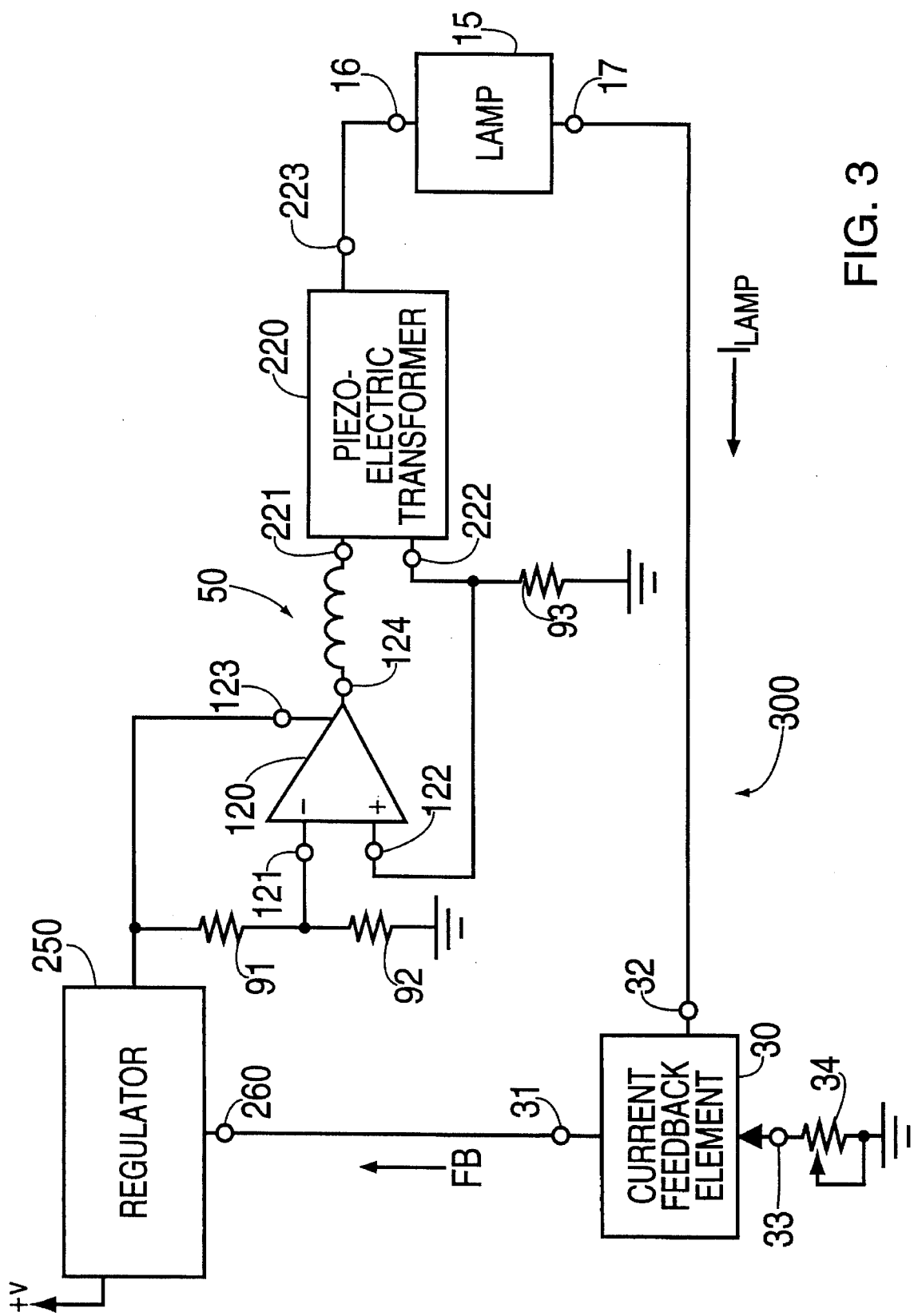
FIG. 3 is a schematic block diagram of one exemplary embodiment of the fluorescent-lamp power-supply and control circuit of FIG. 1.

FIG. 3 provides one embodiment of lamp-driving circuit 300 of the present invention detailing high-voltage conversion and the use of lamp-current feedback in simple resonant mode. Input terminals 121 and 122 of comparator 120 are biased into their linear region through a combination of resistors 91, 92, and 93. Comparator 120 behaves like a voltage source at output terminal 124.

Comparator 120 can be a generic comparator. For example, it may consist of the LT-1011 comparator from Linear Technology Corp. of Milpitas, Calif. (hereinafter "Linear") and a power-stage circuit for providing current gain. The power-stage circuit amplifies the output current of the comparator in order to drive the appropriate amount of current into input terminal 221 of ceramic transformer 220.I Such power-stage circuits are well known in the art. Inductor 50 impedance-matches the input impedance of ceramic transformer 220 with the output voltage drive of comparator 120, while simultaneously providing a voltage step-up.

Positive feedback through terminal 122 of comparator 120 causes oscillation at the resonant frequency of piezoelectric ceramic transformer 220, and the positive feedback maintains the oscillation frequency at resonance. Some positive feedback will occur at non-resonant frequencies, but at orders of magnitude lower than at resonance.

The positive-feedback path is typically provided via a quartz crystal, for example. In the present invention, however, the path runs through ceramic transformer 220, with the return signal being sent to comparator 120 from terminal 222 of ceramic transformer 220. The resultant oscillating signal from comparator 120 at the resonant frequency causes an acoustic wave to be set up in ceramic transformer 220. This acoustic wave is converted to high voltage by the inherent nature of operation of ceramic transformer 220. The voltage at transformer output terminal 223 drives fluorescent lamp 15.

Similar to quartz crystals, ceramic transformer 220 has significant harmonic and overtone modes. The piezoelectric characteristics of ceramic transformer 220 make it function as a narrow-range filter as opposed to the broad-band devices provided by conventional magnetic transformers. As a result, the acoustic wave input to ceramic transformer 220 need not be substantially sinusoidal. Comparator 120's output (at terminal 124) is a square-wave drive signal applied to ceramic transformer 220. Transformer 220 behaves like a highly resonant filter with respect to the resultant acoustic wave propagated in it. In addition, transformer 220 has high voltage gain. The result of these effects is a high-voltage sine wave at the output terminal 223, which advantageously matches the drive characteristics of lamp 15, thus permitting optimum drive.

Regulator 250 regulates the current driven into ceramic transformer 220 by sending a control signal to terminal 123 of comparator 120 to fix or adjust the amplitude of comparator 120's output at terminal 124. Regulator 250 receives feedback signal FB at feedback terminal 260 by which the regulator output can be controlled. Regulator 250 can be a step-down switching regulator which, for example, can consist of Linear's LT-1076 switching regulator coupled to a typical step-down network, as is well known in the art. The signal received at feedback terminal 260 sets the operating point of regulator 250 such that the output voltage of regulator 250 is lower than the input voltage.

Also in FIG. 3 is current feedback element 30, shown coupled at terminal 32 to terminal 17 of lamp 15. Feedback element 30 produces, at terminal 31, feedback signal FB indicative of the magnitude of current $I_{LAMP}$ conducted by fluorescent lamp 15. Many types of current feedback circuits can be used for element 30. Preferably, however, element 30 includes a current-sense impedance coupled between terminal 32 and ground, with signal FB at terminal 31 being a voltage developed across that impedance which is proportional to the magnitude of current $I_{LAMP}$. Also coupled between terminal 33 of current feedback element 30 and ground is a variable resistor 34. Variable resistor 34 can be used to adjust the magnitude of feedback signal FB and, hence, the loop gain and the intensity of fluorescent lamp 15.

The operating current of lamp 15 (and, hence, the intensity of the lamp) can be adjustably controlled by adjusting the feedback gain via the variable resistor 34. By varying resistance, the magnitude of feedback signal FB applied to regulator 250 is varied, ultimately causing the magnitude of lamp current $I_{LAMP}$ to vary responsively. Because fluorescent lamps have high impedance and are essentially current-driven devices, varying the magnitude of $I_{LAMP}$ results in variation of the lamp 15's intensity. Varying resistor 34 thus helps adjust lamp intensity.

Figure 4A:
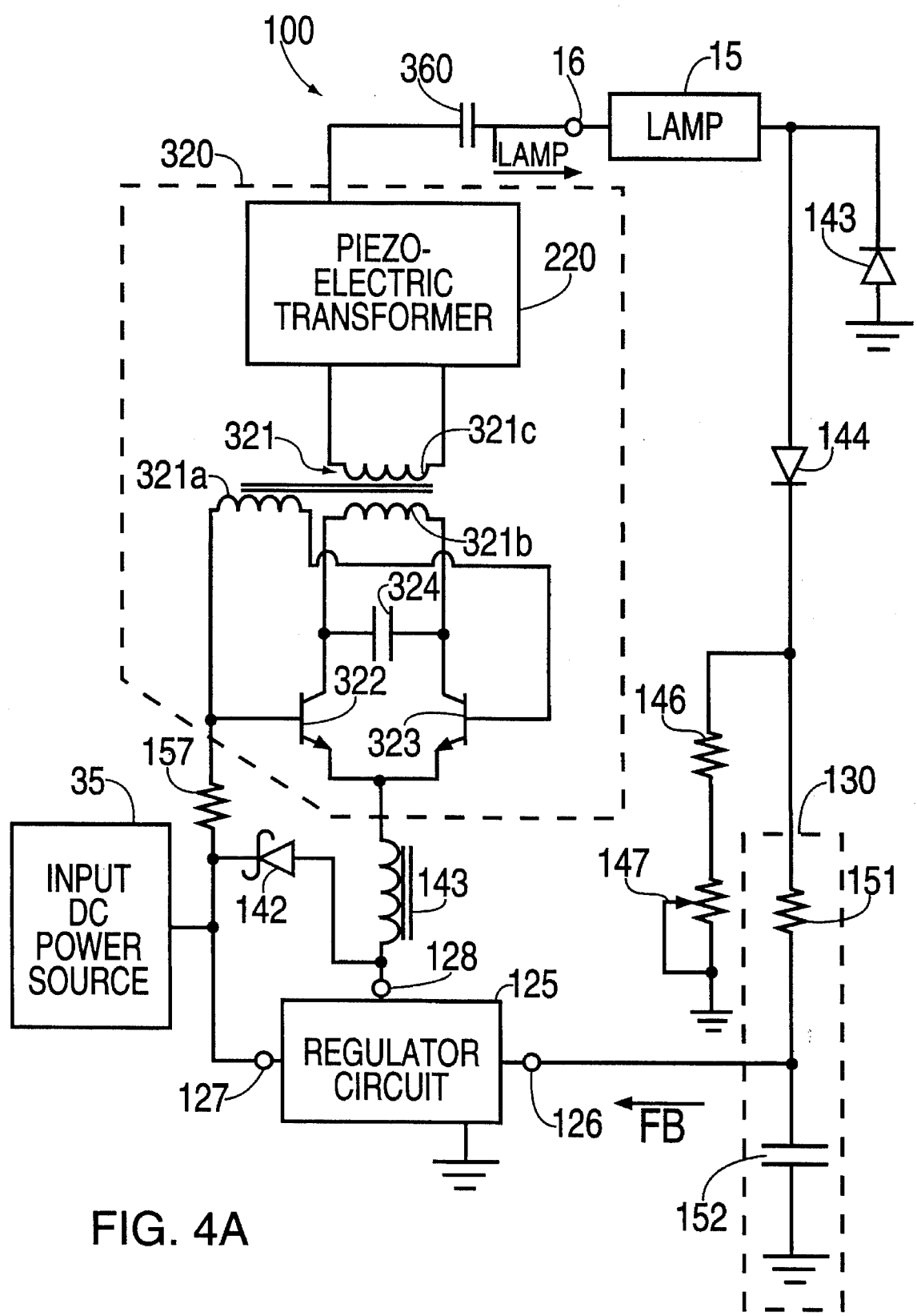
FIGS. 4A–4C are schematic diagrams of further exemplary embodiments of the fluorescent-lamp power-supply and control circuit of FIG. 1.

FIG. 4A is a schematic diagram of one exemplary embodiment of the fluorescent-lamp power-supply and control circuit of FIG. 1.

As shown in FIG. 4A, input DC power source 35 supplies power for fluorescent-lamp power-supply and control circuit 100. Input DC power source 35, which can be any conventional power source, is used to supply low DC voltage (e.g., approximately 3–20 volts) to push-pull high-voltage converter circuit 320 and switching regulator circuit 125. Switching regulator 125 can be any of a number of commercially available switching regulators, such as Linear's LT-1072 integrated circuit switching regulator. When implemented using a LT-1072 switching regulator, regulator circuit 125 includes feedback terminal 126, power terminal 127 coupled to power source 35, and output terminal 128.

Converter circuit 320 is a current-driven, high-voltage, push-pull circuit which converts DC power from input DC power source 35 into high-voltage, sinusoidal AC. At resonance, the piezoelectric characteristics of ceramic transformer 220 make it a high-gain, step-up device with negligible internal impedance. At a non-resonant frequency, ceramic transformer 220 behaves like a high-impedance circuit (theoretically approximating an open circuit) with respect to the acoustic wave propagated in it. As shown in FIG. 2, at "skirt" frequencies, the ceramic transformer 220 has intermediate ranges of impedance.

In FIG. 4A, converter 320 uses both conventional magnetic transformer 321 and ceramic transformer 220. Converter 320 is a self-oscillating circuit. Transistors 322 and 323 conduct out of phase and switch each time transformer 321 saturates. During a complete cycle, the magnetic flux density in the core of transformer 321 varies between a saturation value in one direction and a saturation value in the opposite direction. During the cycle time when the magnetic flux density varies from negative minimum to positive maximum, one of transistors 322 and 323 is ON. During the rest of the cycle time, the other transistor is ON.

Switching of transistors 322 and 323 is initiated when the magnetic flux density in transformer 321 begins to saturate. At that time, the inductance in transformer 321 decreases rapidly towards zero, which causes a quickly rising high collector current to flow in the transistor which is ON. The current spike is picked up by transformer bias winding 321a of transformer 321. Because the base terminals of transistors 322 and 323 are coupled to bias winding 321a, the current spike is fed back into the base of the transistor which produced it. As a result, that transistor drops out of saturation and into cutoff, and the transistor is turned OFF. Accordingly, the current in transformer 321 abruptly drops and the transformer winding voltages then reverse polarity, causing the other transistor, which previously had been OFF, to turn ON. The switching operation is then repeated for the second transistor.

Still referring to FIG. 4A, transistors 322 and 323 alternately switch ON and OFF at a duty cycle of approximately 50 percent. The output of transformer 321 is a higher (relative to the input to transformer 321) voltage drive fed into the input of ceramic transformer 220, which in turn steps up the voltage signal to a level sufficient to drive lamp 15.

Ceramic transformer 220 is the main voltage step-up device in converter 320 for driving lamp 15. As a result, transformer 321 does not have to generate output voltages of the magnitude required by conventional lamp-drive circuits using magnetic transformers. Transformer 321 need only provide a voltage signal sufficient to optimize the input drive to ceramic transformer 220. Thus, the turns ratio between secondary winding 321c and primary winding 321b of transformer 321 is significantly less than the turns ratio for magnetic transformers in conventional lamp-drive circuits. Accordingly, transformer 321 is much smaller than the typical magnetic transformer used in a conventional lamp-drive circuit and does not impose corresponding high-voltage construction constraints.

Capacitor 324, coupled between the collectors of transistors 322 and 323, reduces RF emissions from the circuit without having a negative impact on the operation of ceramic transformer 220. Capacitor 324 causes what would otherwise be square-wave voltage oscillation at the collectors of transistors 322 and 323 to be more sinusoidal to drive magnetic transformer 321. Furthermore, capacitor 324 can be used to help tune oscillation to the resonant frequency of ceramic transformer 220.

The frequency for oscillation (occurring at resonance) is primarily set by the combination of the characteristics of magnetic transformer 321, capacitor 324 coupled between the collectors of transistors 322 and 323, fluorescent lamp 15, and ballast capacitor 360. The resonant frequency inherent to the ceramic transformer 220 is a function of the physical parameters of the device.

Magnetic transformer 321 steps up the sinusoidal voltage at the collectors of transistors 322 and 323 to produce, at secondary winding 321c, an AC voltage sufficient to drive ceramic transformer 220. Ceramic transformer 220 in turn steps up the output voltage of magnetic transformer 321 to produce an AC waveform of sufficiently high voltage to drive fluorescent lamp 15 (shown coupled to transformer 220 through ballast capacitor 360). Ballast capacitor 360 inserts a controlled impedance in series with lamp 15 to minimize sensitivity of the circuit to lamp characteristics. In some embodiments of the present invention, ballast capacitor 360 may be eliminated because of the capacitive nature of the output drive provided by ceramic transformer 220.

Converter 320, in conjunction with current-mode switching regulator circuit 125, thus operates to deliver a controlled AC current at high voltage to terminal 16 of fluorescent lamp 15. Inductor 143, coupled between terminal 128 of regulator 125 and the emitters of transistors 322 and 323, is an energy storage element for switching regulator 125. Inductor 143 also sets the magnitude of the collector currents of transistors 322 and 323 and, hence, the energy through transformer 220 that is delivered to lamp 15. Schottky diode 142, coupled between input DC power source 35 and inductor 143 maintains current flow through inductor 143 during the off cycles of switching regulator circuit 125.

Resistor 157 DC biases the respective bases of transistors 322 and 323.

The current delivered to lamp 15 by transformer 220 ($I_{LAMP}$) is regulated to a substantially constant value by a feedback loop including lamp 15, diode 144 and feedback circuit 130. Diode 144, in conjunction with diode 143, half-wave rectifies lamp current $I_{LAMP}$. Diode 143 shunts negative portions of each cycle of $I_{LAMP}$ to ground, and diode 144 passes positive portions of that current (representing one-half the lamp current $I_{LAMP}$) to feedback circuit 130.

Feedback circuit 130 comprises resistor 151 and capacitor 152 coupled in series between the cathode of diode 144 and ground. This produces a voltage, proportional to the magnitude of $I_{LAMP}$, across capacitor 152. This voltage (FB) is presented to the feedback pin (terminal 126) of switching regulator 125. The above connections close the feedback control loop which regulates lamp current. Resistors 146 and 147, connected in parallel with resistor 151 and capacitor 152, allow for DC adjustment in the voltage (FB) which is presented to the feedback pin.

Upon start-up of circuit 100 of FIG. 4A, the voltage (FB) on feedback pin 126 of switching regulator circuit 125 is generally below the internal reference voltage of regulator circuit 125 (for example, 1.23 volts for the LT-1072 discussed above). Thus, full duty cycle modulation occurs at the output terminal 128 of the regulator circuit 125. As a result, inductor 143 conducts current which flows from magnetic transformer 321, through transistors 322 and 323, into inductor 143. This current is deposited in switched fashion to ground by the regulator's action. This switching action controls lamp 15's average current $I_{LAMP}$, the amount of which is set by the magnitude of the feedback signal FB at the feedback terminal 126.

The feedback loop forces switching regulator 125 to modulate the output of converter 320 to whatever value is required to maintain a constant current in lamp 15. The magnitude of that constant current can, however, be varied by variable resistor 147. Because the intensity of lamp 15 is directly related to the magnitude of the current through the lamp, variable resistor 147 thus allows the intensity of lamp 15 to be adjusted smoothly and continuously over a chosen range of intensities.

Figure 4B:
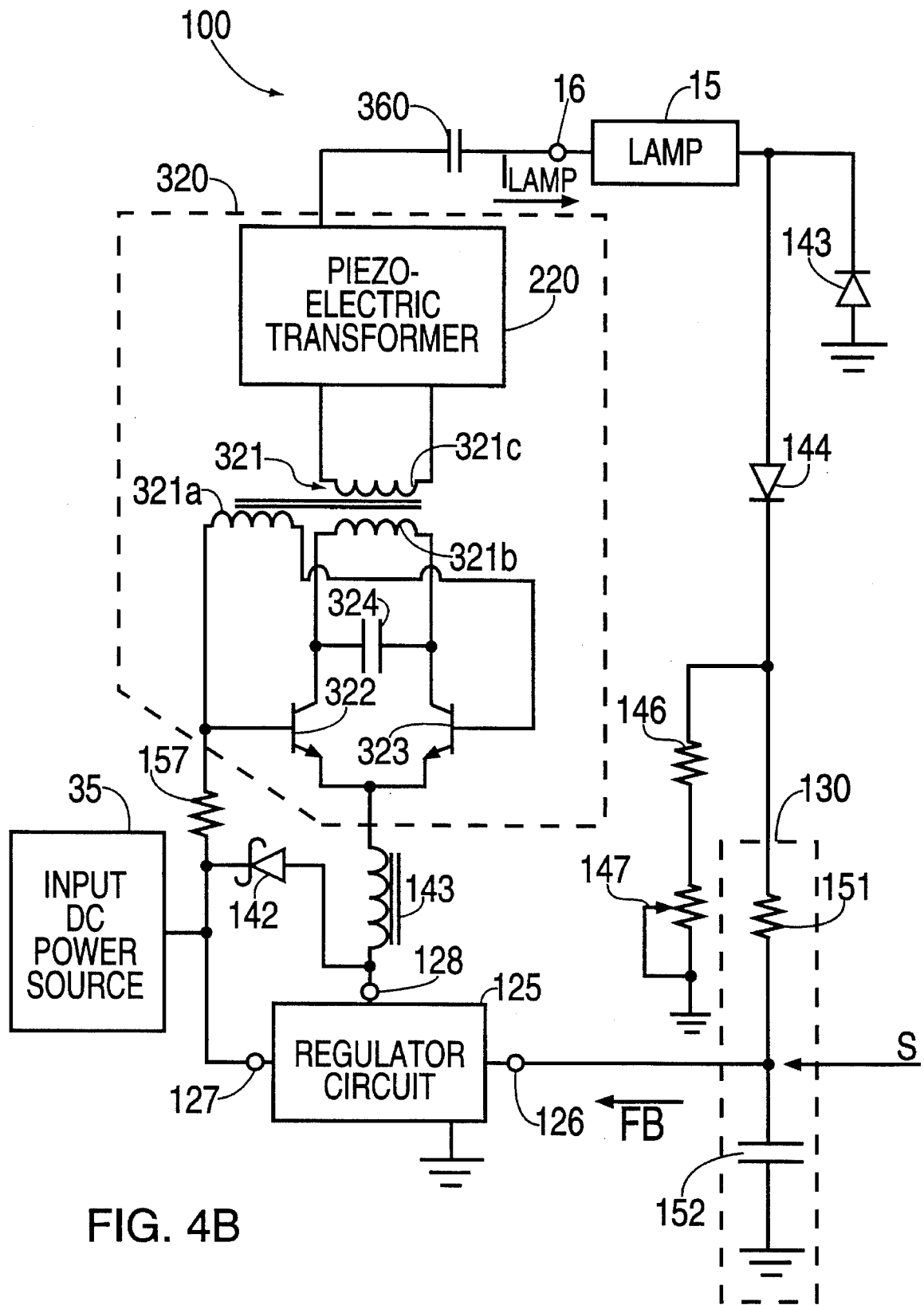

It will be appreciated by those skilled in the art that the circuit of FIG. 4A could be modified in numerous ways without departing from the spirit and scope of the invention. For example, the intensity of lamp 15 could be varied other than by variable resistor 147 by variably introducing a signal S into the feedback loop as shown in FIG. 4B. Signal S operates to vary the loop gain of the feedback loop by varying the magnitude of feedback signal FB applied to regulator 125. Just as with variable resistor 147 in FIG. 4A, the introduction of signal S in FIG. 4B enables the intensity of lamp 15, to be varied.

For example, signal S in FIG. 4B could be taken from the output of a conventional photocell or other optical detector circuit (not shown) which monitors the intensity of ambient light. Such a circuit would enable the fluorescent-lamp power-supply and control circuit to compensate and adjust the fluorescent lamp intensity in response to the intensity of ambient light within the environment. Thus, when the intensity of the environmental ambient light is low, the fluorescent lamp's intensity could be regulated to a high value. Similarly, when the intensity of the environmental ambient light is high, the fluorescent lamp's intensity could be regulated to a low value. It will be appreciated by those skilled in the art, of course, that signal S could come from virtually any other circuit to cause the intensity of the fluorescent lamp to vary in some desired manner. In addition, it will be appreciated by those skilled in the art that further modifications, also within the scope of the invention, can include various circuit configurations for driving a plurality of fluorescent lamps.

Figure 4C:
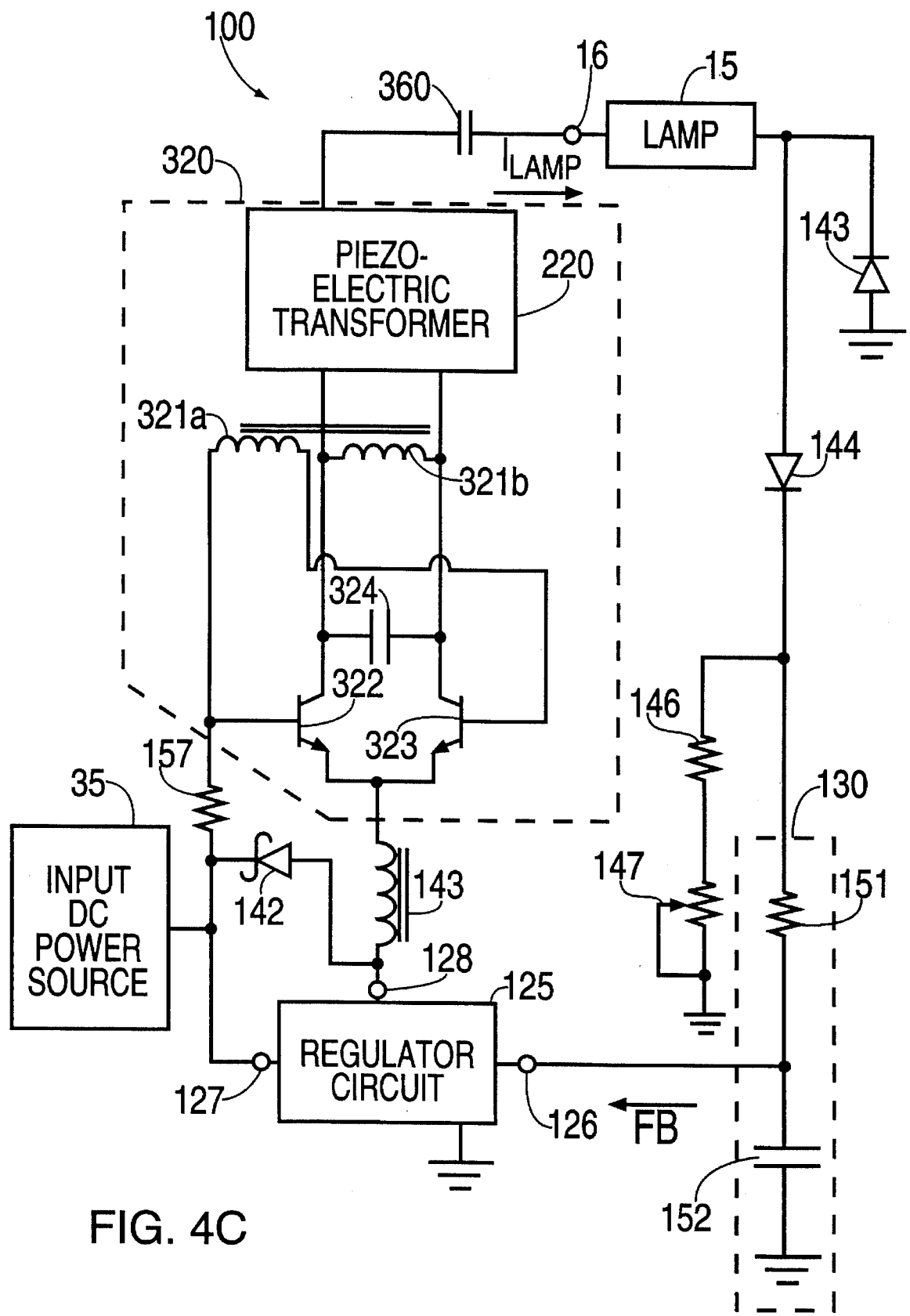

Yet a further extension of circuit 100 of FIG. 4A is provided in FIG. 4C. In FIG. 4C, the secondary winding of conventional magnetic transformer 321 is eliminated. As a result, ceramic transformer 220 is coupled directly to the collectors of transistors 322 and 323.

Again, converter 320 is a self-oscillating circuit. Operation of the circuit in FIG. 4C is the same as the operation in FIG. 4A. Because the secondary winding of magnetic transformer 321 is eliminated in FIG. 4C, magnetic transformer 321 can be even smaller than the magnetic transformer used FIG. 4A. Primary winding 321*b* of magnetic transformer 321 sufficiently optimizes the input drive to ceramic transformer 220.

Figure 5A:
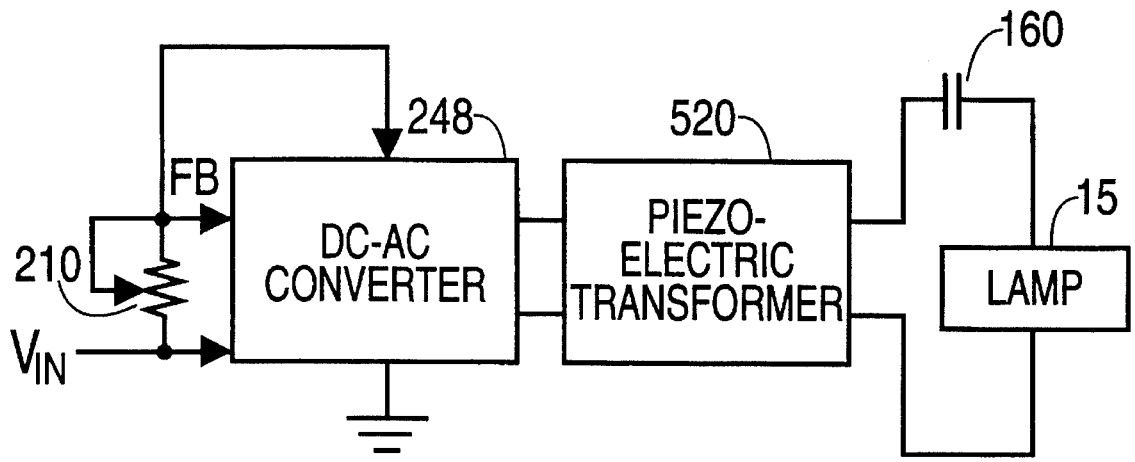
FIGS. 5A–5D are schematic block diagrams showing various exemplary configurations of other embodiments in accordance with a further aspect of the invention in which a fluorescent lamp's output is indirectly monitored and in which the lamp is floated instead of grounded at one terminal.
Figure 5B:
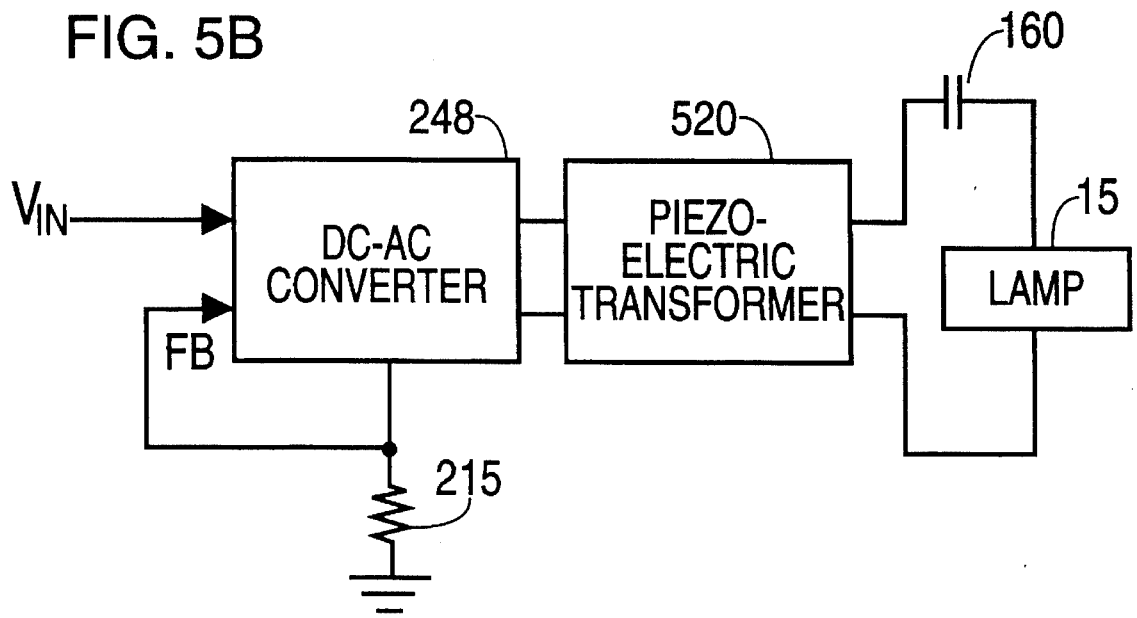
Figure 5C:
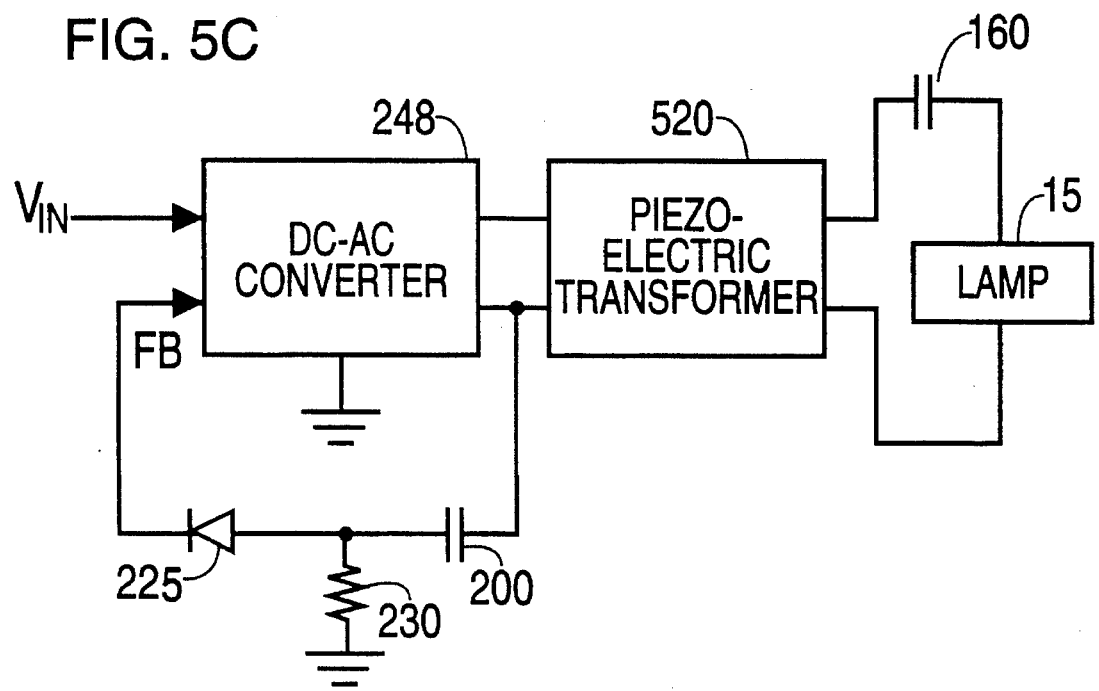
Figure 5D:
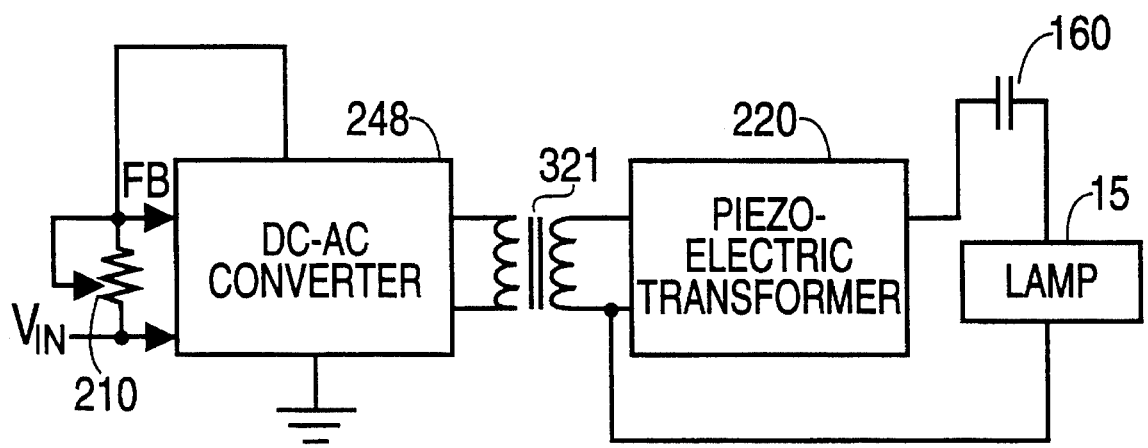

FIGS. 5A–5C show various exemplary configurations of another embodiment in accordance with a further aspect of the invention in which a fluorescent lamp's output is indirectly monitored and in which the lamp may be floated across the terminals of a four-terminal ceramic transformer. FIG. 5D shows an exemplary configuration of an embodiment in which both a conventional magnetic transformer and a three-terminal ceramic transformer are used, and in which the lamp may be floated across the output terminals of the magnetic transformer.

FIGS. 5A–5D are simplified diagrams of circuits to provide regulation of a fluorescent lamp over an extended range of intensities, such that the lamp's intensity is more consistently distributed along the longitudinal length of the lamp. Although the circuits shown in FIGS. 5A–5D are particularly effective for operating cold-cathode fluorescent lamps, the circuits of FIGS. 5A–5D may also be used to drive hot cathode fluorescent lamps.

As shown in FIG. 5A, DC-AC converter 248 drives the input terminals of ceramic transformer 520. Converter 248 is a simplified representation of various components shown in FIG. 1, and includes at least regulator 25 and a DC-to-AC converter element. The output terminals of ceramic transformer 520 are coupled across a cold-cathode fluorescent lamp 15. A conventional ballast capacitor 160 is also shown coupled in series with the lamp 15. As provided in connection with FIG. 4A, this capacitor may be eliminated in other embodiments employing the principles of the present invention.

Regulation of lamp 15 is provided by supplying a feedback signal to converter 248. The feedback signal, developed across impedance 210 (shown as a resistor, although other suitable forms of impedance may be used), is proportional to the input current. The feedback signal is coupled to converter 248 to regulate the current through lamp 15 and, hence, the amount of light emitted by the lamp 15. This feedback signal, which indirectly monitors the lamp's drive power, differs from the arrangement shown in FIGS. 1, 3, and 4A–4C, in which a feedback signal is extracted directly from the lamp output circuitry. In addition, impedance 210 is preferably a variable impedance which receives user inputs that cause converter 248 to vary the intensity of lamp 15 correspondingly.

Floating lamp 15 across the output terminals of ceramic transformer 520 to isolate the lamp from its drive circuitry, and indirectly measuring the drive provided to the lamp, is advantageous because no connection is involved which would cause asymmetrical drive to the lamp 15. This results in a more uniformly distributed electric field within the lamp, which enhances the lamp's ability to uniformly emit light along its entire length at lower operating currents.

An additional benefit is that overall efficiency of the lamp-drive circuit is enhanced because the net energy loss due to parasitic capacitances is decreased. Parasitic capacitances exist along the lines connected to either terminal of fluorescent lamp 15. The magnitude of energy loss over a capacitance is directly proportional to the voltage drop across that capacitance. When lamp 15 is floated instead of grounded at one terminal, parasitic capacitances at the high-voltage end of lamp 15 see less voltage swing (one-half of what would otherwise be the voltage swing if the low-voltage end of lamp 15 were grounded). Energy losses due to these capacitances is thus lower. The result is a net decrease in parasitic-capacitance energy loss and hence greater overall circuit efficiency.

FIG. 5B shows another way to indirectly monitor the drive to lamp 215. In FIG. 5B, the current passing through the return (ground) terminal of converter 248 is monitored via impedance 215 (shown as a resistor, although other suitable forms of impedance could be used) coupled in series between converter 248 and ground. The voltage developed across impedance 215 is used as a feedback signal, and coupled as shown to a feedback terminal of converter 248 to control the lamp's drive as hereinbefore described. One disadvantage of the approach of FIG. 5B, as compared to that of FIG. 5A, is that additional signal processing within or around converter 248 may be required to obtain good regulation as operating conditions change. This is so because the return line of converter 248 typically contains highly non-linear signal components.

FIG. 5C shows yet another way to indirectly monitor the drive provided to lamp 15. In this figure, feedback signal FB is generated by sampling a portion of ceramic transformer 520's input AC voltage signal. The feedback loop includes capacitor 200, one terminal of which is coupled to an input terminal of ceramic transformer 520. The other terminal of capacitor 200 is coupled to the anode of diode 225 and to a first terminal of impedance 230. The other terminal of impedance 230 is coupled to ground, while the cathode of diode 225 is coupled to the feedback input terminal of converter 248.

FIG. 5D shows a way to indirectly monitor the input drive to lamp 215 where a conventional magnetic transformer is used in conjunction with a three-terminal ceramic transformer. In FIG. 5D, lamp 15 is floated across the output terminal of ceramic transformer 220 and the output terminal of magnetic transformer 321. Lamp 15 is thus isolated from converter 248, which operates in the same manner as in FIG. 5A.

It will be understood by persons skilled in the art that other circuit arrangements for indirectly monitoring the drive to lamp 215 may be used, and that the circuits of FIGS. 5A–5D are intended only to be representative, but not exhaustive, of such circuits. It should also be apparent to persons skilled in the art that indirect measurement of the drive to the lamp does not require floating the lamp from the drive circuitry. Any of the indirect measurement techniques shown in FIGS. 5A–5D can be applied to any of the lamp configurations shown in FIGS. 2, 3, and 4A–4C.

Figure 6:
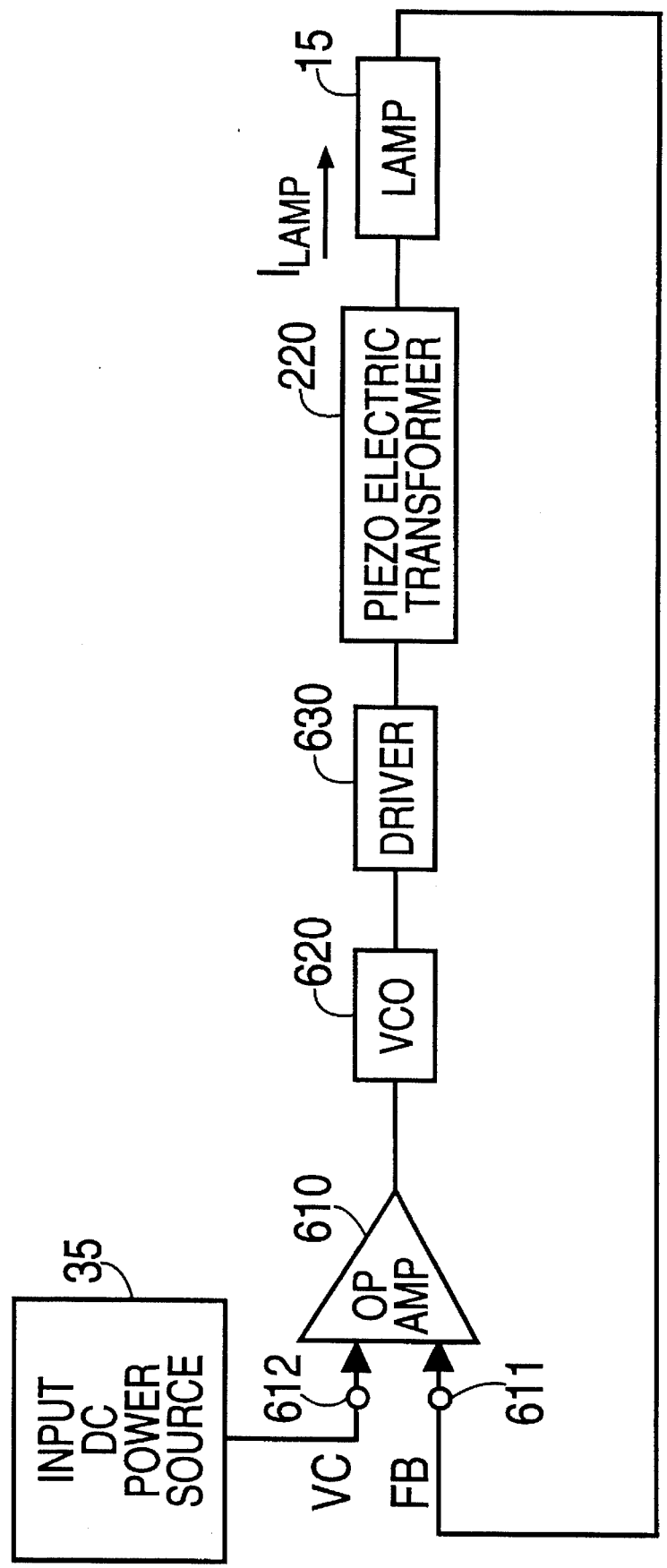
FIG. 6 is a block diagram of a further embodiment of a fluorescent-lamp power-supply and control circuit incorporating principles of the present invention.

FIG. 6 is a block diagram of a further exemplary configuration of the present invention employing the piezoelectric characteristics of ceramic transformer 220. In FIG. 6, input DC power source 35 applies a voltage-control signal (VC) to terminal 612 of operational amplifier 610. Op amp 610 generates an output DC-voltage signal that sets the operating frequency of voltage-controlled oscillator 620 (VCO). The DC-voltage signal is proportional to feedback signal FB sensed at the feedback pin (terminal 611) of op amp 610. The DC-voltage signal is used to drive voltage-controlled oscillator 620 to produce an AC output signal. The magnitude of the AC signal is amplified by driver 630, the output of which is used to drive ceramic transformer 220. Ceramic transformer 220 outputs a stepped-up, sinusoidal voltage waveform to drive lamp 15. The current $I_{LAMP}$ through lamp 15 is fed back to produce feedback signal FB sensed at the feedback pin (terminal 611) of op amp 610 to close the feedback loop. The current-sensing feedback loop regulates the lamp drive.

Oscillation frequency in the system of FIG. 6 is controlled by op amp 610 (which senses voltage-control signal VC and feedback signal FB) coupled with oscillator 620. Unlike the embodiments of the present invention in FIGS. 1, 3, 4A–4C, and 5D, the embodiment in FIG. 6 does not provide constant operation at the resonant frequency of ceramic transformer 220. Instead of maintaining operation at full resonance and varying only the amount of power delivered to the lamp-drive circuit, FIG. 6 provides a system in which the operating frequency is varied over a range including resonance and off-resonance.

Voltage-control signal VC can be adjusted to direct the system embodied in FIG. 6 to drive lamp 15 at off-resonance frequencies. Attempts to drive lamp 15 at the "skirt" frequencies shown in FIG. 2 will cause ceramic transformer 220 to operate at less than full resonance. Thus, ceramic transformer 220 does not conduct full drive current to lamp 15. Accordingly, the light intensity of lamp 15 will not be fully "ON." At frequencies outside of resonance and the skirts, ceramic transformer 220 does not conduct any drive current to lamp 15.

Varying the operating frequency of the system by adjusting voltage-control signal VC can thus be used to dim the light intensity of lamp 15. The light intensity can range from fully or substantially "ON" (at full resonance) to fully or substantially "OFF" (at frequencies outside of the "skirts"), with intermediate dim light emissions achieved by driving lamp 15 at skirt frequencies.

Figure 7:
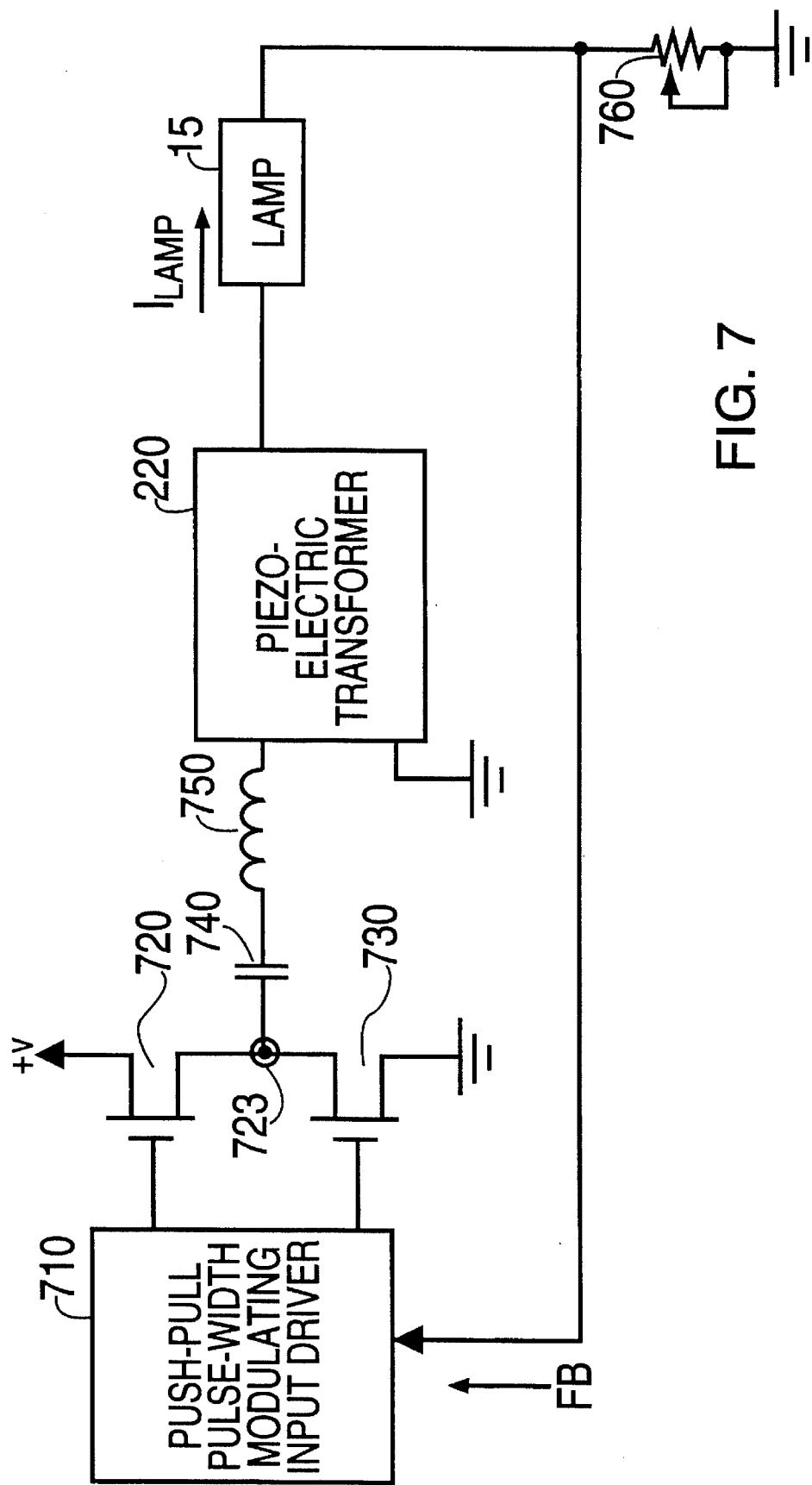
FIG. 7 is a schematic block diagram of another exemplary embodiment of the fluorescent-lamp power-supply and control circuit of FIG. 1.

FIG. 7 is a schematic block diagram of another embodiment of the present invention in accordance with the circuit principles set forth by FIG. 1.

In the circuit of FIG. 7, input driver 710 produces pulse-width modulated output signals to drive MOS transistors 720 and 730. Input driver 710 includes a regulator. In turn, transistors 720 and 730 alternately switch ON and OFF at a maximum duty cycle of approximately 50 percent. When transistor 720 is ON and transistor 730 is OFF, inductor 750 charges and current sources through transistor 720 to ceramic transformer 220. When transistor 730 is ON and transistor 720 is OFF, inductor 750 discharges and current sinks through transistor 730 to ground.

Inductor 750 impedance-matches the input impedance of ceramic transformer 220 with the output voltage drive of transistors 720 and 730. Inductor 750 also provides a voltage step-up to drive ceramic transformer 220. The piezoelectric characteristics of transformer 220 make it function as a narrow-range filter as opposed to the broadband devices provided by conventional magnetic transformers. As a result, the acoustic wave input to transformer 220 need not be substantially sinusoidal. Capacitor 740, however, can still be used to reduce RF emissions from the circuit. Capacitor 740 blocks DC signal components and smooths out what would otherwise be square-wave voltage oscillation at output terminal 723 of transistors 720 and 730.

The resonant frequency inherent to the ceramic transformer 220 is a function of the physical parameters of the device. Ceramic transformer 220 steps up the input voltage to produce an AC waveform of sufficiently high voltage to drive fluorescent lamp 15.

A feedback control loop around lamp 15 is closed with a path returning feedback signal FB to input driver 710. The feedback loop senses lamp current $I_{LAMP}$, and this information sets the operating point of the input driver 710. Driver 710's pulse-width modulated outputs set the available drive to the piezoelectric transformer. The operating current of lamp 15 can be controlled by adjusting the value of variable resistor 760. By varying resistance, the magnitude of the feedback signal FB applied to input driver 710 is varied, ultimately causing lamp current $I_{LAMP}$ to vary responsively. Because fluorescent lamps have high impedance and are essentially current-driven devices, varying the magnitude of $I_{LAMP}$ results in variation of the lamp 15's intensity.

Persons of ordinary skill in the art will recognize that the power-supply and control circuit of the present invention could be implemented using circuit configurations other than those shown and discussed above. All such modifications are within the scope of the present invention, which is limited only by the claims which follow.

What is claimed is:

1. A circuit for operating a fluorescent lamp from a DC power source, the circuit comprising:

a regulator having an input coupled to the DC power source, an output, and a control terminal for receiving a feedback signal to control current produced at the output;

a DC-to-AC converter, having a ceramic transformer, coupled to the output of the regulator, for producing at an output terminal an AC signal sufficient to cause the fluorescent lamp to emit light; and a monitoring element for monitoring a current indicative of current conducted by the fluorescent lamp and for generating a feedback signal indicative of current conducted by the fluorescent lamp, the feedback signal being coupled to the regulator to cause the light emitted by the lamp to be regulated.

2. The circuit of claim 1, wherein the lamp and converter are coupled such that the lamp is isolated from the converter.

3. The circuit of claim 1, further including a feedback-signal adjusting circuit for responsively adjusting current conducted by the fluorescent lamp.

4. The circuit of claim 1, wherein the AC signal produced by the DC-to-AC converter at the output terminal is substantially sinusoidal.

5. The circuit of claim 1, wherein the fluorescent lamp is coupled to a ballast capacitor.

6. The circuit of claim 1, wherein the monitoring element produces a feedback signal that is proportional to current conducted by the fluorescent lamp.

7. The circuit of claim 6, wherein the monitoring element includes an impedance coupled in series with the regulator control terminal, and the feedback signal comprises a voltage developed across at least a portion of the impedance.

8. The circuit of claim 3, wherein the monitoring element includes a first impedance adapted to be coupled in series with the regulator control terminal and the feedback signal comprises a voltage developed across at least a portion of the first impedance, and wherein the feedback-signal adjusting circuit comprises a variable impedance coupled in series with at least a portion of the first impedance, the variable impedance having a range of adjustment sufficient to vary the intensity of the fluorescent lamp.

9. The circuit of claim 1, wherein the regulator is a switching regulator.

10. The circuit of claim 1, wherein the regulator is a current-mode switching regulator.

11. A circuit for operating a fluorescent lamp from a DC power source, the circuit comprising:

a regulator having an input coupled to the DC power source, an output, and a control terminal for receiving a feedback signal to control current produced at the output;

a DC-to-AC converter, having a ceramic transformer, coupled to the output of the regulator, for producing at an output terminal an AC signal;

a coupling element for coupling the lamp to the converter; and a monitoring element for monitoring a current signal indicative of current conducted by the lamp and for generating a feedback signal indicative of current conducted by the lamp, said feedback signal being coupled to the regulator to cause light to be emitted by the lamp to be regulated.

12. The circuit of claim 11, wherein the coupling element isolates the lamp from the converter.

13. The circuit of claim 11, further including a feedback-signal adjusting element for responsively adjusting current conducted by the fluorescent lamp.

14. The circuit of claim 11, wherein the AC signal produced by the DC-to-AC converter at the output terminal is substantially sinusoidal.

15. The circuit of claim 11, wherein the fluorescent lamp is coupled to a ballast capacitor.

16. The circuit of claim 11, wherein the monitoring element produces a feedback signal that is proportional to current conducted by the fluorescent lamp.

17. The circuit of claim 16, wherein the monitoring element includes an impedance coupled in series with the regulator control terminal, and the feedback signal comprises a voltage developed across at least a portion of the impedance.

18. The circuit of claim 13, wherein the monitoring element includes a first impedance coupled in series with the regulator control terminal and the feedback signal comprises a voltage developed across at least a portion of the first impedance, and wherein the feedback-signal adjusting element comprises a variable impedance coupled in series with at least a portion of the first impedance, the variable impedance having a range of adjustment sufficient to vary the intensity of the fluorescent lamp.

19. The circuit of claim 11, wherein the regulator is a switching regulator.

20. The circuit of claim 11, wherein the regulator is a current-mode switching regulator.

21. A circuit for operating a fluorescent lamp from a source of DC power, the circuit comprising:

a regulator for producing a regulated DC output, the regulator having an input for receiving a feedback signal to control current produced at the DC output;

a DC-to-AC converter, coupled to the regulated DC output of the regulator, for producing an AC voltage at an AC output;

a ceramic step-up transformer having a first terminal coupled to the AC output of the converter and having a second terminal coupled to the fluorescent lamp; and a monitoring element for monitoring current supplied to the fluorescent lamp and generating a feedback signal to regulate light emitted by the lamp.

22. The circuit of claim 21, wherein the second terminal and the lamp are coupled such that the lamp is isolated from converter.

23. The circuit of claim 21, further including an adjustment element for varying the feedback signal to responsively vary current conducted by the fluorescent lamp.

24. The circuit of claim 21, wherein the monitoring element comprises:

a rectifier for rectifying current conducted by the first terminal;

a resistance coupled in series with the rectifier; and a capacitance coupled in series with the resistance for filtering the rectified current, wherein the feedback signal comprises a voltage developed across the capacitance.

25. The circuit of claim 24, further comprising:

a variable resistance coupled to the monitoring element to vary the magnitude of the feedback signal and to responsively vary current conducted by the fluorescent lamp.

26. A circuit for operating a fluorescent lamp from a source of DC power, the circuit comprising:

a current-mode switching regulator having an input coupled to the source of DC power, an output, and a control terminal adapted for receiving a signal to control current produced at the output;

an oscillator coupled to the output of the switching regulator, the oscillator producing an AC voltage;

a ceramic step-up transformer having a first terminal, and a second terminal coupled to the fluorescent lamp, the first terminal being coupled to the oscillator to transform the AC voltage produced by the oscillator to a high AC voltage at the second terminal sufficient to operate the fluorescent lamp; and a sensing element including an impedance adapted to sense an input current at the input of the switching regulator to generate a feedback signal proportional to the input current, the current-sensing element being coupled to conduct the feedback signal to the control terminal of the switching regulator to regulate current conducted and intensity of light emitted by the fluorescent lamp.

27. The circuit of claim 26, wherein the fluorescent lamp is isolated from both the switching regulator and the oscillator.

28. A circuit for operating a fluorescent lamp from a source of DC power, the circuit comprising:

a current-mode switching regulator having an input coupled to the source of DC power, an output, and a control terminal for receiving a signal to control current produced at the output;

an oscillator coupled to the output of the switching regulator, the oscillator producing an AC voltage;

a ceramic step-up transformer having a first terminal, and a second terminal coupled to the fluorescent lamp, the first terminal being coupled to the oscillator to transform the AC voltage produced by the oscillator to a high AC voltage at the second terminal sufficient to operate the fluorescent lamp; and a current-sensing element including an impedance adapted to sense an input current at the first terminal of the transformer to generate a feedback signal proportional to the input current, the current-sensing element being coupled to conduct the feedback signal to the switching regulator to regulate current conducted and intensity of light emitted by the fluorescent lamp.

29. The circuit of claim 28, wherein the fluorescent lamp is isolated from both the switching regulator and the oscillator.

30. A circuit operable from a DC power source, the circuit comprising:

at least one fluorescent lamp;

a DC-to-AC converter, having an input coupled to the DC power source, an output, and a control terminal for receiving a feedback signal to control a current indicative of current conducted by the fluorescent lamp;

a ceramic step-up transformer, coupled to the output of the converter, for producing at an output terminal high-voltage AC sufficient to cause the fluorescent lamp to emit light, the output terminal being coupled to generate a current through the fluorescent lamp; and a sensing element for sensing current conducted by the fluorescent lamp by monitoring current passing through the converter, for generating a feedback signal indicative of the magnitude of current passing through the fluorescent lamp, and for coupling the feedback signal to the converter to regulate current conducted and intensity of light emitted by the lamp.

31. The circuit of claim 30, wherein the fluorescent lamp is isolated from the converter.

32. A method for operating a fluorescent lamp from a DC power source, the method comprising the steps of:

converting DC power into AC voltage;

using a ceramic transformer to convert the AC voltage to a high-voltage AC signal sufficient to generate a current through the fluorescent lamp to cause the fluorescent lamp to emit light;

sensing current conducted by the fluorescent lamp by monitoring a current indicative of current conducted by the fluorescent lamp during the step of converting;

generating a feedback signal indicative of the magnitude of the monitored current; and controlling the conversion of DC power to high-voltage AC in response to the feedback signal to regulate current conducted and intensity of light emitted by the lamp.

33. The method of claim 32, wherein the sensing step monitors current that is isolated from the lamp.

34. The method of claim 32, further including the step of adjusting the feedback signal to responsively adjust current conducted by the fluorescent lamp.

35. The method of claim 32, wherein the controlling step converts the DC power into substantially sinusoidal high-voltage AC.

36. The method of claim 32, wherein the feedback signal is proportional to current conducted by the fluorescent lamp.

* * * * *